United States Patent Office 3,342,920
Patented Sept. 19, 1967

3,342,920
METHOD OF MANUFACTURING SYNTHETIC FIBERS CONTAINING CRYSTALLINE ISOTACTIC POLYSTYRENE HAVING EXCELLENT PHYSICAL PROPERTIES
Osamu Fukushima and Kiyokazu Imai, Kurashiki, Japan, assignors to Kurashiki Rayon Company Limited, Kurashiki, Japan, a corporation of Japan
No Drawing. Filed June 27, 1963, Ser. No. 290,923
Claims priority, application Japan, July 27, 1962, 37/31,285
1 Claim. (Cl. 264—184)

The present invention relates to a method of manufacturing synthetic fibers consisting of the A-polymer and the isotactic crystalline polystyrene which is characterized in that a mixed spinning solution of polyvinyl chloride, polyvinylidene chloride, or a copolymer (A-polymer) essentially consisting of vinyl chloride or vinylidene chloride and an isotactic crystalline polystyrene in a common solvent (plasticizer) is used to spin filaments.

The principal object of the invention is to manufacture synthetic fibers having excellent mechanical properties and excellent heat resistance and elasticity which had never been obtained in filaments formed of copolymer mainly consisting of vinyl chloride, or vinylidene chloride, or polyvinyl chloride, polyvinylidene chloride alone.

The inventors have made detailed and accurate investigations about polymer blends with the object of greatly improving the heat resistance of the filaments of the polyvinyl chloride and polyvinylidene chloride system and found that the mixed filament consisting of the A-polymer and a crystalline isotactic polystyrene exhibits a large improvement in heat resistance and at the same time in elasticity if compared with a filament made of the A-polymer alone.

At present, there are two kinds of polystyrene, that is, non-crystalline isotactic polystyrene and crystalline isotactic polystyrene. The hot water resistance and heat resistance of a mixed filament consisting of polystyrene and polyvinyl chloride at a ratio of 1:1 are shown in Table 1 for the sake of comparison.

TABLE 1

| Polystyrene | Shrinkage in water at 100° C. (percent) | Temperature of air for 10% contraction (° C.) |
|---|---|---|
| Non-crystalline | 25 | 125 |
| Crystalline | 1.5 | 180 |

As apparent from the above table, the object of the invention can be attained by using the crystalline polystyrene.

As an embodiment of the invention, 6 parts of polyvinyl chloride (polymerization degree 1,450) and 4 parts of crystalline isotactic polystyrene (polymerization degree 3,500) were mixed and dissolved in tetrahydrofuran to provide a concentration of 17%, and the mixed spinning solution thus prepared was extruded through a spinneret of 0.3 mm. dia. into water by wet spinning and the filament thus spun was heat stretched 500% in water at 100° C., the mixed filament of the invention had physical properties as shown in Table 2.

For comparison, the physical properties of the filament of polyvinyl chloride (polymerization degree 1,450) alone are also shown in Table 2.

TABLE 2

Sample 1: represents the mixed filament according to the invention.
Sample 2: represents filament of polyvinyl chloride alone.

| Sample | Fineness (dr.) | Dry Tenacity (g./d.) | Dry Elongation (percent) | Elongation elasticity (elongation) 3% | Elongation elasticity (elongation) 5% | Shrinkage in water at 100° C. (percent) | Air Temperature for 10% shrinkage (percent) |
|---|---|---|---|---|---|---|---|
| 1 | 2.5 | 3.90 | 21.0 | 90 | 80 | 1.0 | 180 |
| 2 | 2.5 | 4.21 | 20.0 | 80 | 65 | 38 | 110 |

It will be apparent from the above table that the mixed filament according to the invention has a large improvement in hot resistance and also in elongation elasticity compared with those of the filament of polyvinyl chloride alone.

The reason why such improved results can be obtained is not yet sufficiently clear, yet it may perhaps be based on the fact that the mixed spinning solution of the invention does not show the molecular mixing, but the A-polymer and the crystalline isotactic polystyrene maintain the mixed state in the dispersed condition each independently and moreover, such dispersed mixed condition is very stable so that even what the solution is left alone for more than 24 hours it exhibits no demixing phenomenon.

The invention will now be explained further in detail by examples, which are not limitative of the invention.

EXAMPLE 1

50 parts of polyvinyl chloride (polymerization degree 1,450) and 50 parts of crystalline isotactic polystyrene (polymerization degree 5,000) were mixed and dissolved in a solvent consisting of 95 parts of tetrahydrofuran and 5 parts of toluene to have a concentration of 17%, thereby providing a mixed spinning solution.

The spinning solution thus prepared was extruded through a spinneret of 0.15 mm. dia. into water and after passage for 1.5 m. through a coagulating bath the filament was stretched 100% in water at 20 to 40° C., then stretched 350% in warm water at 90 to 95° C., then dried and heat set in air at 120° C.

The mixed filament thus obtained showed a very good heat resistance and elasticity as shown in Table 1.

EXAMPLE 2

6 parts of polyvinyl chloride (polymerization degree 1,450) and 4 parts of crystalline isotactic polystyrene (polymerization degree 3,500) were mixed and dissolved in tetrahydrofuran to have a concentration of 23% to provide a mixed spinning solution.

The spinning solution was extruded through a spinneret of 0.3 mm. dia. into air at 120° C. and after passing for 5 m. through the spinning tower the filament was wound up at a velocity of 120 m./min. and then heat stretched 400% in air at 120° C. and then heat shrunk 10% in air at 120° C.

The mixed filaments thus obtained showed excellent physical properties as shown in Table 2.

EXAMPLE 3

7 parts of copolymer (polymerization degree 1,600) consisting of 60 parts of vinyl chloride and 40 parts of vinylidene chloride, and 3 parts of crystalline isotactic polystyrene (polymerization degree 4,000) were mixed and dissolved in cyclohexane to have a concentration of 25%, thereby providing a mixed spinning solution.

The mixed spinning solution was dry spun in the similar manner to Example 2 and the mixed filament thus obtained showed the superior properties the same as shown in Table 1.

What we claim is:

A method of manufacturing mixed filaments which comprises dissolving from 50 to 30 parts by weight of a crystalline isotactic polystyrene and from 50 to 70 parts by weight of a polymer selected from the group consisting of polyvinyl chloride, polyvinylidene chloride, a copolymer consisting essentially of vinyl chloride and a copolymer consisting essentially of vinylidene chloride in a common solvent, and extruding the resulting mixed spinning solution.

References Cited

UNITED STATES PATENTS

| | | | |
|---|---|---|---|
| 3,014,887 | 12/1961 | Haward | 260—93.55 X |
| 3,019,077 | 1/1962 | Carey et al. | 260—93.55 |
| 3,037,948 | 5/1962 | Landler et al. | 260—876 X |
| 3,055,730 | 9/1962 | Robinson et al. | 264—184 |
| 3,069,406 | 12/1962 | Newman et al. | |
| 3,110,548 | 11/1963 | Fukushima et al. | 264—184 |
| 3,112,300 | 11/1963 | Natta et al. | 260—93.55 X |
| 3,112,301 | 11/1963 | Natta et al. | 260—93.55 X |

ALEXANDER H. BRODMERKEL, *Primary Examiner.*

F. S. WHISENHUNT, J. H. WOO, *Assistant Examiners.*